(12) United States Patent
Dogariu et al.

(10) Patent No.: US 12,209,911 B2
(45) Date of Patent: Jan. 28, 2025

(54) SINGLE-SHOT LOW-LIGHT POLARIMETER

(71) Applicant: University of Central Florida Research Foundation, Inc., Orlando, FL (US)

(72) Inventors: Aristide Dogariu, Orlando, FL (US); Mahdi Eshaghi, Orlando, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 303 days.

(21) Appl. No.: 17/888,898

(22) Filed: Aug. 16, 2022

(65) Prior Publication Data

US 2023/0051001 A1 Feb. 16, 2023

Related U.S. Application Data

(60) Provisional application No. 63/233,548, filed on Aug. 16, 2021.

(51) Int. Cl.
*G01J 4/04* (2006.01)
(52) U.S. Cl.
CPC ..................................... *G01J 4/04* (2013.01)
(58) Field of Classification Search
None
See application file for complete search history.

(56) References Cited

U.S. PATENT DOCUMENTS 6,888,638 B1\* 5/2005 Hill .................... G01B 9/02003
356/508
9,182,283 B2\* 11/2015 Robinson .............. G01J 3/2823

OTHER PUBLICATIONS

Arnold, D.A.; Method of Calculating Retroreflector-array Transfer Functions; 1979; Smithsonian Astrophysical Observatory; pp. 57-67 (Year: 1979) (Year: 1979).\*

\* cited by examiner

*Primary Examiner* — Edmond C Lau
*Assistant Examiner* — Paul Schnase
(74) *Attorney, Agent, or Firm* — Suiter Swantz IP

(57) ABSTRACT

A polarimeter may include a non-polarizing beamsplitter to split an input beam into a first beam and a second beam, a corner-cube retroreflector to retroreflect the first beam as a polarization-split beam, and a mirror to retroreflect the second beam as a retroreflected second beam. A beam profile of the polarization-split beam includes six regions with different states of polarization associated with a different order of reflections in the corner-cube retroreflector. The non-polarizing beamsplitter may combine the polarization-split beam and the retroreflected second beam as an intensity-split beam having six intensity regions associated with interference of the polarization-split beam with the retroreflected second beam. The polarimeter may further include a detector to measure an intensity of at least some of the six intensity regions and a controller to determine a polarization of the input beam based on the intensities of the at least some of the six intensity regions.

20 Claims, 9 Drawing Sheets

SINGLE-SHOT LOW-LIGHT POLARIMETER

CROSS-REFERENCE TO RELATED APPLICATION

The present application claims the benefit under 35 U.S.C. § 119 (e) of U.S. Provisional Application Ser. No. 63/233,548, filed Aug. 16, 2021, entitled SINGLE-SHOT LOW-LIGHT POLARIMETER, naming Aristide Dogariu and Mahdi Eshaghi as inventors, which is incorporated herein by reference in the entirety.

GOVERNMENT LICENSE RIGHTS

This invention was made with Government support under contract number N000141812262 awarded by Office of Naval Research. The Government has certain rights in this invention.

TECHNICAL FIELD

The present disclosure is directed generally to polarimetry and, more particularly, to single-shot polarimetry.

BACKGROUND

Polarimeters are commonly used to measure the state of polarization of light. However, existing polarimeters typically require precise alignment of incident light, utilize only a fraction of the incident light for a particular measurement, and/or require multiple measurements to fully characterize the state of polarization of the incident light. As a result, existing polarimeters are not suitable for many applications including, but not limited to, single-shot or low-light applications. There is therefore a need to develop systems and methods to cure the above deficiencies.

SUMMARY

A polarimeter is disclosed in accordance with one or more illustrative embodiments of the present disclosure. In one illustrative embodiment, the polarimeter includes a non-polarizing beamsplitter to split an input beam into a first beam along a first optical path and a second beam along a second optical path. In another illustrative embodiment, the polarimeter includes a corner-cube retroreflector including three orthogonal reflective faces intersecting at an apex point, where the corner-cube retroreflector receives the first beam at a location including the apex point and retroreflects the first beam as a polarization-split beam. In another illustrative embodiment, a beam profile of the polarization-split beam includes six regions with different states of polarization, where each of the six regions is associated with a different order of reflections from the three orthogonal reflective faces of the corner-cube retroreflector. In another illustrative embodiment, the polarimeter includes a mirror in the second path to retroreflect the second beam as a retroreflected second beam, wherein the non-polarizing beamsplitter combines the polarization-split beam and the retroreflected second beam as an intensity-split beam, where an intensity profile of the intensity-split beam includes six intensity regions associated with interference of the six regions of the polarization-split beam with the retroreflected second beam. In another illustrative embodiment, the polarimeter includes one or more detectors to measure an intensity of the intensity-split beam in at least some of the six intensity regions. In another illustrative embodiment, the polarimeter includes a controller to determine a state of polarization of the input beam based on the intensity of the intensity-split beam in the at least some of the six intensity regions.

A polarimeter is disclosed in accordance with one or more illustrative embodiments of the present disclosure. In one illustrative embodiment, the polarimeter includes an interferometer to split an input beam into a first beam along a first path and a second beam along a second path, where the interferometer includes a self-reflecting optical element located in the first path. In another illustrative embodiment, the self-reflecting optical element includes three or more reflective surfaces to reflect different portions of a beam profile of the first beam along different paths between the three or more reflective surfaces to form a polarization-split first beam. In another illustrative embodiment, a beam profile of the polarization-split beam includes multiple regions associated with different paths between the three or more reflective surfaces, where the interferometer further combines light from the first and second paths to form an intensity-split beam. In another illustrative embodiment, an intensity profile of the intensity-split beam includes multiple intensity regions associated with interference of the plurality of polarization regions of the polarization-split beam with the second beam. In another illustrative embodiment, the polarimeter includes one or more detectors to measure an intensity of the intensity-split beam in at least some of the intensity regions. In another illustrative embodiment, the polarimeter includes a controller to determine a state of polarization of the input beam based on the intensity of the intensity-split beam in at least some of the intensity regions.

A method is disclosed in accordance with one or more illustrative embodiments of the present disclosure. In one illustrative embodiment, the method includes splitting an input beam into a first beam along a first path and a second beam along a second path. In another illustrative embodiment, the method includes reflecting the first beam by a self-reflecting optical element located in the first path, where the self-reflecting optical element includes three or more reflective surfaces configured to reflect different portions of a beam profile of the first beam along different paths between the three or more reflective surfaces to form a polarization-split first beam. In another illustrative embodiment, a beam profile of the polarization-split beam includes a plurality of regions associated with a plurality of different paths between the three or more reflective surfaces. In another illustrative embodiment, the method includes interfering the polarization-split beam with the second beam to form an intensity-split beam, where an intensity profile of the intensity-split beam includes a plurality of intensity regions associated with interference of the plurality of polarization regions of the polarization-split beam with the second beam. In another illustrative embodiment, the method includes measuring an intensity of the intensity-split beam in at least some of the plurality of intensity regions. In another illustrative embodiment, the method includes determining a state of polarization of the input beam based on the intensity of the intensity-split beam in the at least some of the plurality of intensity regions.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Figure 1:
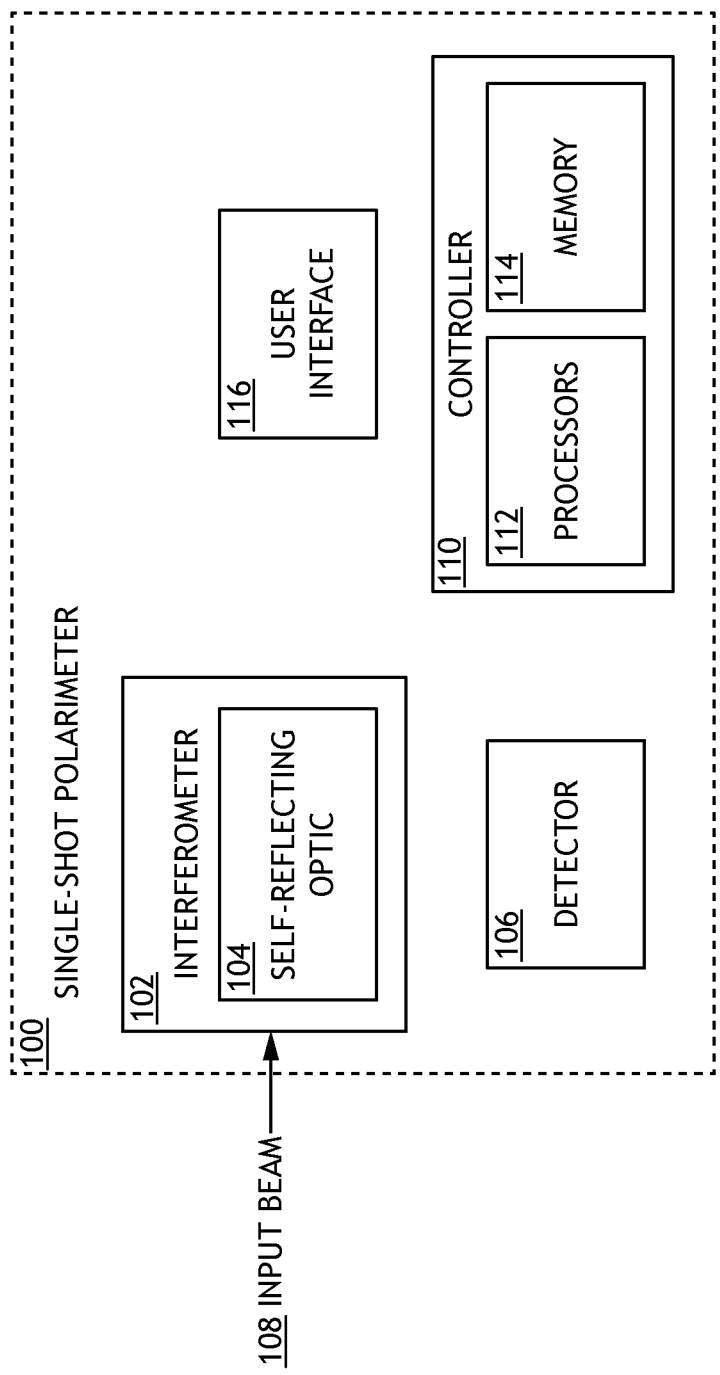
FIG. 1 is a block-diagram view of a single-shot polarimeter, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for single-shot polarimetry. In some embodiments, single-shot polarimetry is performed by interfering an input beam (e.g., a beam of light to be analyzed) with a version of itself modified by interaction with a corner-cube retroreflector or other self-reflecting optical element that imparts different polarization transformations on different portions (or regions) of the beam profile. The resulting distribution of states of polarization induced by the corner-cube retroreflector or other self-reflecting optic may result in a corresponding distribution of intensity values of a combined beam from the interferometer, which is referred to herein as an intensity-split beam. It is contemplated herein that the state of polarization of the input beam may be fully characterized by this distribution of intensity values. For example, the four Stokes parameters may be determined from this distribution of intensity values.

It is further contemplated herein that the systems and methods disclosed herein provide many benefits and are suitable for a wide variety of applications. For example, polarimetric information is extracted based on an instantaneous distribution of intensity values across an interference plane based on a single-measurement configuration with no moving parts or adjustments required. As a result, the systems and methods disclosed herein may determine polarimetric information for a single pulse of an input beam having any duration as well as for a continuous-wave input beam. In contrast, traditional polarimetric techniques typically require multiple measurements with different configurations of polarization-modification optics such as polarizers, or waveplates to provide polarimetric information and are thus less desirable for dynamic or time-sensitive applications. By way of another example, the systems and methods disclosed herein efficiently utilize all of the incident light and are thus well-suited for low-power applications such as, but not limited to, microscopy or biological applications. In contrast, many traditional techniques propagate an input beam through a linear polarizer, which may reject 50% of the incident power. By way of another example, the systems and methods disclosed herein may operate at any wavelength or range of wavelengths with proper selection of optics and detectors. By way of another example, the systems and methods disclosed herein may provide polarimetric information for input beams with a wide range of coherence lengths. In particular, the use of a specific coherence length of the input beam is limited only by the interferometer design such that operation for light fields with coherence lengths on the order of tens of nanometers or shorter are feasible. Further, adjustable filters prior to the system may facilitate operation over broader ranges as is known in the art.

The systems and methods disclosed herein may utilize any self-reflecting optic to induce different polarization transformations on different portions (or regions) of the beam profile. In some embodiments, a single-shot polarimeter includes a corner-cube retroreflector including three orthogonal reflective surfaces intersecting at an apex point as a self-reflecting optic. For example, a beam incident on a region of a corner-cube retroreflector including the apex point may be retroreflected along its original path. Further, different portions of the input beam (e.g., different regions of a beam profile of the input beam) propagate along different paths between the constituent reflective surfaces and thus experience different polarization transformations. In particular, a beam profile of the retroreflected beam may be divided into six regions (referred to herein as polarization regions) intersecting at a location associated with the apex point, where light in each polarization region has a potentially different state of polarization associated with a particular path through the corner-cube retroreflector. As a result, an intensity profile at an interference plane with an unmodified portion of the input beam may include six corresponding regions (referred to herein as intensity regions) with potentially different intensities based on the polarization-specific interference differences in each region. It is to be understood, however, that the disclosure is not limited to corner-cube retroreflectors or retroreflecting configurations. Further, the self-reflecting optic may be implemented with any combination of external reflections (e.g., mirror surfaces) or internal reflections (e.g., total internal reflection from prism surfaces).

The systems and methods disclosed herein may utilize any type or design of interferometer to interfere a portion of an input beam modified by a self-reflecting optic with an unmodified version of itself. In some embodiments, a single-shot polarimeter includes a Michelson interferometer formed with a non-polarizing beamsplitter. For example, a single-shot polarimeter may include non-polarizing beamsplitter which may split an incident beam into a first beam along a first path and a second beam along a second path, a self-reflecting element such as a corner-cube retroreflector in the first path and a typical single-plane mirror in the second path. It is contemplated herein that such a design may beneficially provide a compact, rugged system with no moving parts. Further, such a system may be implemented with any combination of discrete or integrated components. As an illustration, a non-polarizing beamsplitter and a prism-type corner-cube retroreflector (e.g., a trihedral prism) may be constructed as a single optical element. Further, a reflective coating may be applied to one face to form a single-plane mirror in a second arm such that a full interferometer may be constructed as a single optical element.

In some embodiments, the systems and methods disclosed herein provide spatially-resolved single-shot polarimetric measurements. For example, each intensity region in an interference plane may have a uniform intensity when the polarization profile of the input beam is spatially homogenous. However, a spatially non-homogeneous polarization profile may induce corresponding intensity variations within each intensity region. Accordingly, a spatially-resolved polarization measurement may be made based on intensities in corresponding sub-sections of each intensity region. As an illustration, a radially-resolved polarization measurement may be generated by considering intensities of the intensity-split beam within a selected radial band.

Referring now to FIGS. 1-8, systems and methods for single-shot polarimetry are described in greater detail in accordance with one or more embodiments of the present disclosure.

FIG. 1 is a block-diagram view of a single-shot polarimeter 100, in accordance with one or more embodiments of the present disclosure. In some embodiments, the single-shot polarimeter 100 includes an interferometer 102 with a self-reflecting optic 104 in one arm and a detector 106 located at an output of the interferometer 102. The interferometer 102 may thus split an incident input beam 108 (e.g., light to be characterized) as an input, propagate a portion of the input beam 108 to the self-reflecting optic 104 to generate a polarization-split beam, and combine the polarization-split beam with an unmodified version of itself to interfere the two beams and form an intensity-split beam. The detector 106 may then be positioned to capture at least a portion of the resulting intensity-split beam.

In some embodiments, the single-shot polarimeter 100 includes a controller 110, which may be communicatively coupled to any other components of the single-shot polarimeter 100 such as, but not limited to, the detector 106. In some embodiments, the controller 110 includes one or more processors 112. For example, the one or more processors 112 may be configured to execute a set of program instructions maintained in a memory device 114, or memory. The one or more processors 112 of a controller 110 may include any processing element known in the art. In this sense, the one or more processors 112 may include any microprocessor-type device configured to execute algorithms and/or instructions. For example, the controller 110 may direct (e.g., through control signals) and/or or receive data from any component of the single-shot polarimeter 100 such as, but not limited to, the detector 106. The controller 110 may further be configured to perform any of the various process steps described throughout the present disclosure such as, but not limited to, determining a state of polarization of the input beam 108 based on data from the detector 106.

The one or more processors 112 of a controller 110 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 112 may include any device configured to execute algorithms and/or instructions (e.g., program instructions stored in memory). In some embodiments, the one or more processors 112 may be embodied as a mobile device (e.g., mobile phone, or the like), tablet computer, desktop computer, mainframe computer system, workstation, image computer, parallel processor, networked computer, or any other computer system configured to execute a program configured to operate or operate in conjunction with the components of the single-shot polarimeter 100, as described throughout the present disclosure. Moreover, different subsystems of the single-shot polarimeter 100 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 110 may include one or more controllers housed in a common housing or within multiple housings. In this way, any controller or combination of controllers may be separately packaged as a module suitable for integration into the single-shot polarimeter 100.

The memory device 114 may include any storage medium known in the art suitable for storing program instructions executable by the associated one or more processors 112. For example, the memory device 114 may include a non-transitory memory medium. By way of another example, the memory device 114 may include, but is not limited to, a read-only memory (ROM), a random-access memory (RAM), a magnetic or optical memory device (e.g., disk), a magnetic tape, a solid-state drive and the like. It is further noted that the memory device 114 may be housed in a common controller housing with the one or more processors 112. In some embodiments, the memory device 114 may be located remotely with respect to the physical location of the one or more processors 112 and the controller 110. For instance, the one or more processors 112 of the controller 110 may access a remote memory (e.g., server), accessible through a network (e.g., internet, intranet and the like).

In some embodiments, the single-shot polarimeter 100 includes a user interface 116 communicatively coupled to the controller 110. In some embodiments, the user interface 116 may include, but is not limited to, one or more mobile devices, desktops, laptops, tablets, and the like. In some embodiments, the user interface 116 includes a display used to display data of the single-shot polarimeter 100 to a user and/or an input interface to accept user input. The display of the user interface 116 may include any display known in the art such as, but is not limited to, a liquid crystal display (LCD), an organic light-emitting diode (OLED) based display, or a CRT display. The input interface may similarly include any interface known in the art such as, but not limited to, a touch-screen, a mouse, a keyboard, or a voice input interface. Those skilled in the art should recognize that any display and/or input devices capable of integration with a user interface 116 are suitable for implementation in the present disclosure.

Referring now to FIGS. 2-7, various aspects of the single-shot polarimeter 100 and their operation are described in greater detail, in accordance with one or more embodiments of the present disclosure.

Figure 2:
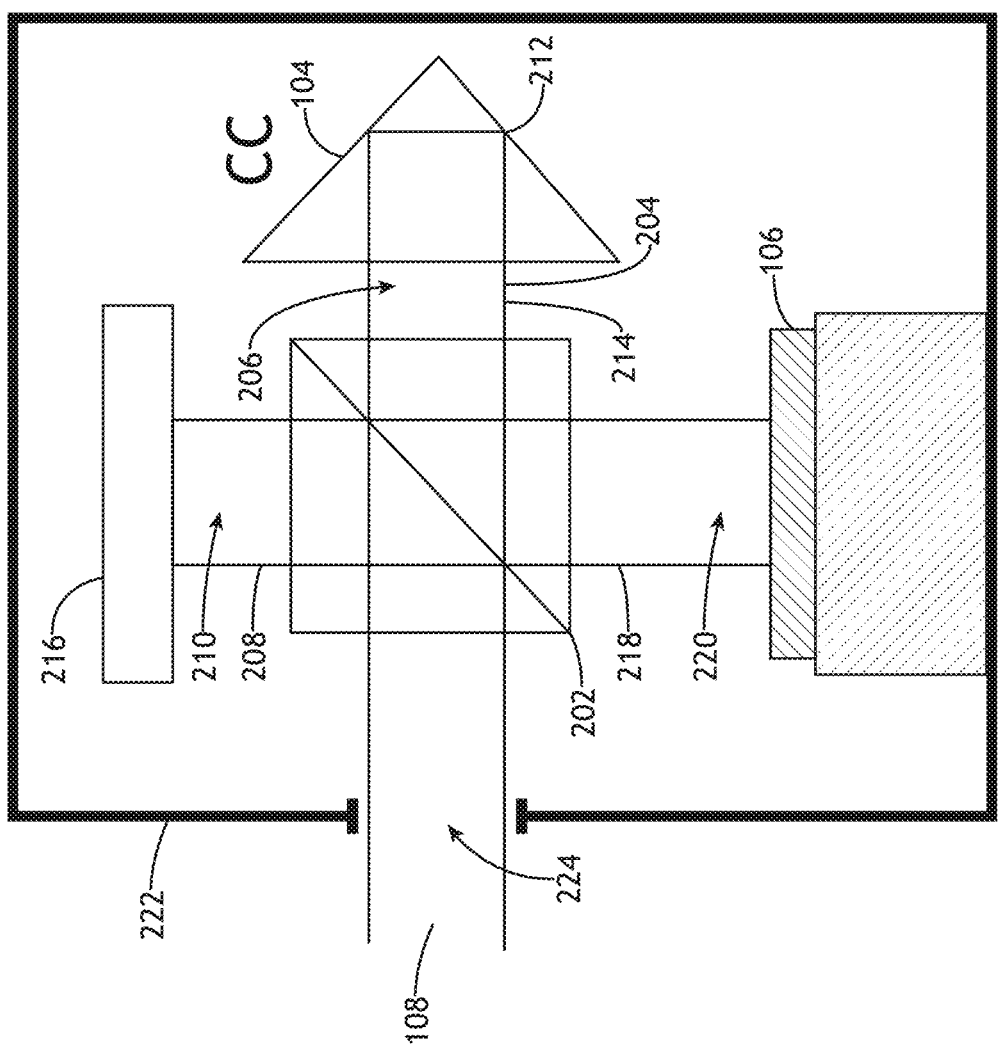
FIG. 2 is a schematic view of the interferometer and detector, in accordance with one or more embodiments of the present disclosure.

The single-shot polarimeter 100 may include any type or design of interferometer 102 known in the art. FIG. 2 is a schematic view of the interferometer 102 and detector 106, in accordance with one or more embodiments of the present disclosure. In particular, FIG. 2 illustrates a Michelson interferometer 102 including a non-polarizing beamsplitter 202 to split the input beam 108 into a first beam 204 along a first path 206 and a second beam 208 along a second path 210. FIG. 2 further illustrates a self-reflecting optic 104 formed as a corner-cube retroreflector 212 (CC) in the first path 206 to retroreflect the first beam 204 as a polarization-split beam 214 having different states of polarization in different regions of a beam profile, and a single-plane mirror 216 in the second path 210 to retroreflect the second beam 208 having same state of polarization as the input beam 108 (or a simple reflection thereof). In this configuration, the non-polarizing beamsplitter 202 combines the polarization-split beam 214 with the retroreflected second beam 208 to form an intensity-split beam 218 propagating along a detection path 220, where the intensity-split beam 218 has different intensities in different regions of a beam profile based on polarization-induced differences in each region as well as different geometrical phase differences that exists between each part of polarization-split beam 214 and the input beam 108.

The single-shot polarimeter 100 may additionally include various components to secure, mount, store, and/or align the interferometer 102 and/or the detector 106. For example, as illustrated in FIG. 2, the single-shot polarimeter 100 may include a casing 222 to at least partially surround the interferometer 102 and/or the detector 106. The single-shot polarimeter 100 may further include an input aperture 224 to facilitate alignment of the input beam 108 with the interferometer 102, which may optionally be integrated into the casing 222 as illustrated in FIG. 2 or provided as a separate component.

The single-shot polarimeter 100 may include any type of self-reflecting optic 104 known in the art to induce different polarization transformations for different regions across the beam profile of the input beam 108 (or the first beam 204 in the first path 206 of the interferometer 102). Further, the self-reflecting optic 104 may utilize any combination of external reflections (e.g., from mirrors) or internal reflections (e.g., from internal reflections of prism surfaces).

FIGS. 3-6 illustrate the operation of a self-reflecting optic 104 formed as a corner-cube retroreflector 212 (e.g., as illustrated in FIG. 2), in accordance with one or more embodiments of the present disclosure.

Figure 3:
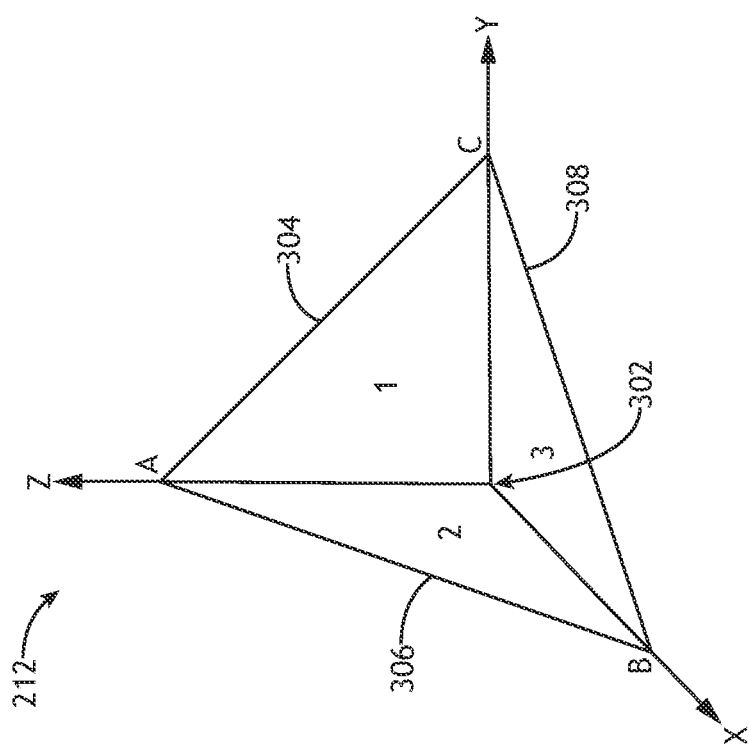
FIG. 3 is a schematic view of a corner-cube retroreflector, in accordance with one or more embodiments of the present disclosure.

FIG. 3 is a schematic view of a corner-cube retroreflector 212, in accordance with one or more embodiments of the present disclosure. For example, a corner-cube retroreflector 212 may include three orthogonal reflective surfaces arranged to intersect at an apex point 302. In FIG. 3, corner-cube retroreflector 212 includes a first reflective surface 304 (labeled as 1) in a Y-Z plane, a second reflective surface 306 (labeled as 2) in an X-Z plane, and a third reflective surface 308 (labeled as 3) in an X-Y plane.

It is contemplated herein that directing the first beam 204 (e.g., in the first path 206 of the interferometer 102) to a region of the corner-cube retroreflector 212 including the apex point 302 may result in a retroreflection along the first path 206. However, light in different regions of the first beam 204 will propagate along different paths through the corner-cube retroreflector 212. In particular, light in different regions of the first beam 204 will interact with the orthogonal reflective surfaces of the corner-cube retroreflector 212 in different orders. As a consequence, the light in the different regions will undergo different polarization transformations as a result of the particular paths through the corner-cube retroreflector 212.

The optical field of the first beam 204, which is equivalent to that of the input beam 108, may be described as:

$$E_I = \begin{pmatrix} E_s \\ E_p \end{pmatrix}, \tag{1}$$

where subscripts s and p denote the orthogonal polarizations. The optical field of the polarization-split beam 214 emanating from the corner-cube retroreflector 212 (e.g., the retroreflected first beam 204) may be written as:

$$E_{cc} = J^{lmn} \begin{pmatrix} E_s \\ E_p \end{pmatrix}, \tag{2}$$

where lmn represents the order in which light in a particular region reflects off of the constituent reflective surfaces of the corner-cube retroreflector 212, and $J^{lmn}$ represents the Jones matrix associated with the particular region. For example, $J^{123}$ is the Jones matrix associated with a region in which light sequentially reflects off of the first reflective surface 304, second reflective surface 306, and then the third reflective surface 308. By way of another example, $J^{231}$ is the Jones matrix associated with a region in which light sequentially reflects off of the second reflective surface 306, the third reflective surface 308, and then the first reflective surface 304.

Figure 4:
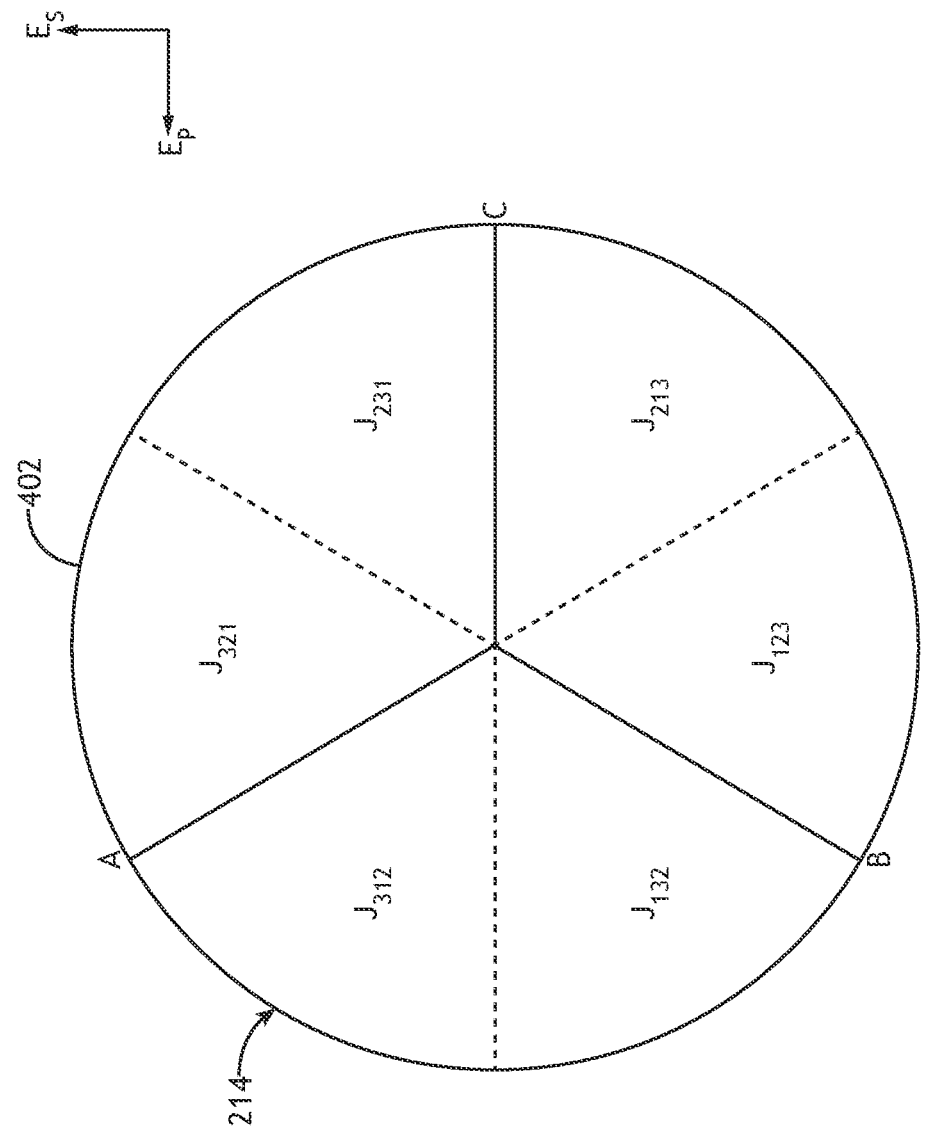
FIG. 4 is a conceptual view of a beam profile of the beam reflected by the corner-cube retroreflector in FIG. 3 that includes six polarization regions, in accordance with one or more embodiments of the present disclosure.

FIG. 4 is a conceptual view of a beam profile of the beam reflected by the corner-cube retroreflector 212 in FIG. 3 (e.g., the polarization-split beam 214) that includes six polarization regions 402, in accordance with one or more embodiments of the present disclosure.

Equations (3)-(8) include the Jones matrices illustrated in FIG. 4.

$$J^{123} = \frac{r_s^3}{16} \begin{pmatrix} -(t^3 - 3t^2 + 15t + 3) & \sqrt{3}(t-1)(t+1)^2 \\ \sqrt{3}(t-1)(t+1)^2 & -(3t^3 + 15t^2 - 3t + 1) \end{pmatrix}, \tag{3}$$

$$J^{321} = \frac{r_s^3}{16} \begin{pmatrix} -(t^3 - 3t^2 + 15t + 3) & -\sqrt{3}(t-1)(t+1)^2 \\ -\sqrt{3}(t-1)(t+1)^2 & -(3t^3 + 15t^2 - 3t + 1) \end{pmatrix}, \tag{4}$$

-continued $$J^{231} = \frac{r_s^3}{8}\begin{pmatrix} t^3 + 6t^2 - 3t & -\sqrt{3}(t+1)^2 \\ \sqrt{3}t(t+1)^2 & -3t^2 + 6t + 1 \end{pmatrix}, \quad (5)$$

$$J^{132} = \frac{r_s^3}{8}\begin{pmatrix} t^3 + 6t^2 - 3t & -\sqrt{3}t(t+1)^2 \\ \sqrt{3}(t+1)^2 & -3t^2 + 6t + 1 \end{pmatrix}, \quad (6)$$

$$J^{312} = \frac{r_s^3}{8}\begin{pmatrix} t^3 + 6t^2 - 3t & \sqrt{3}t(t+1)^2 \\ -\sqrt{3}(t+1)^2 & -3t^2 + 6t + 1 \end{pmatrix}, \quad (7)$$

$$J^{213} = \frac{r_s^3}{8}\begin{pmatrix} t^3 + 6t^2 - 3t & \sqrt{3}(t+1)^2 \\ -\sqrt{3}t(t+1)^2 & -3t^2 + 6t + 1 \end{pmatrix}, \quad (8)$$

where $t=r_p/r_s$ is the ratio of complex reflection coefficients for p and s polarizations, respectively.

Figure 5B:
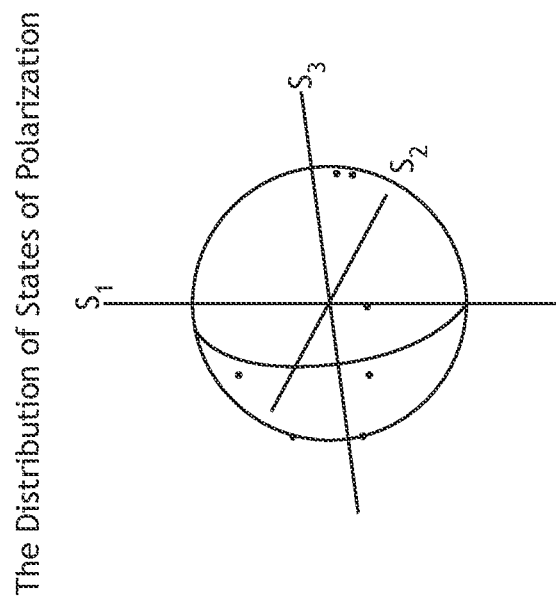
FIG. 5B is a plot of a distribution of the states of polarization illustrated in FIG. 5A, in accordance with one or more embodiments of the present disclosure.
Figure 5A:
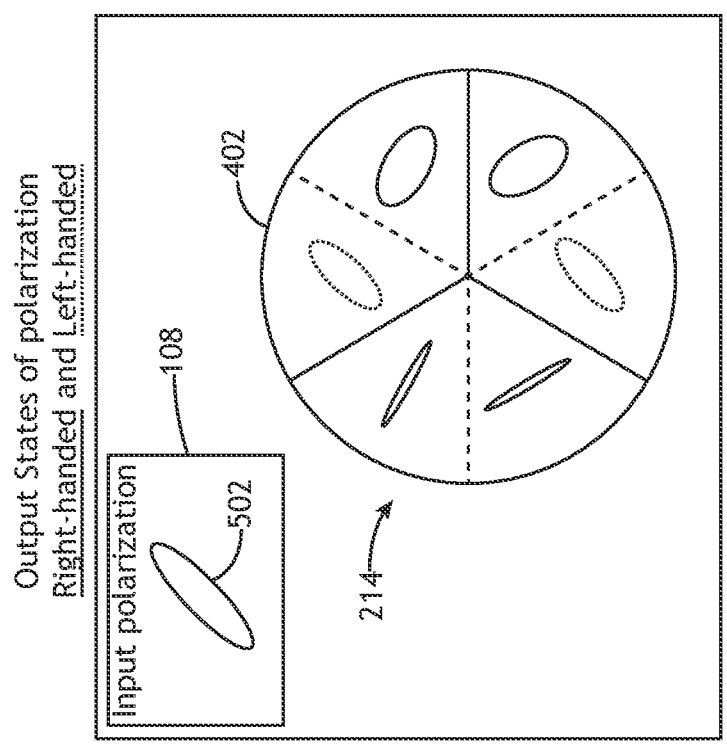
FIG. 5A is a conceptual view of the states of polarization in the six polarizations regions associated with an input beam with a first state of polarization generated by retroreflection in the corner-cube retroreflector, in accordance with one or more embodiments of the present disclosure.
Figure 5D:
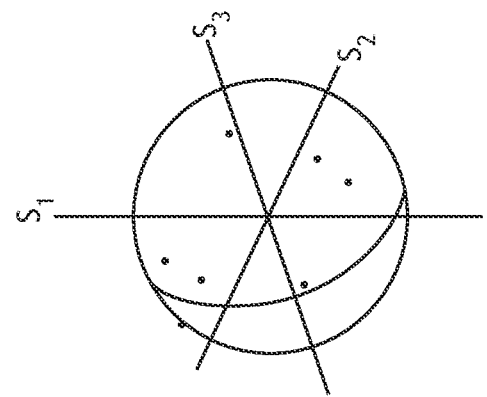
FIG. 5D is a plot of a distribution of the states of polarization illustrated in FIG. 5C, in accordance with one or more embodiments of the present disclosure.
Figure 5C:
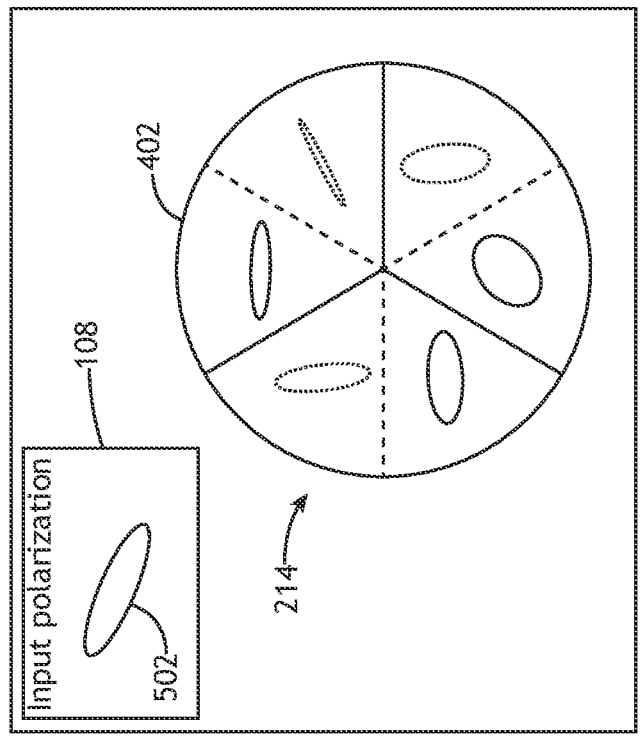
FIG. 5C is a conceptual view of the states of polarization in the six polarizations regions associated with an input beam with a second state of polarization generated by retroreflection in the corner-cube retroreflector, in accordance with one or more embodiments of the present disclosure.

As an illustration, FIGS. 5A-5D include simulations of the polarization transformations in the six polarizations regions 402 based on two arbitrary states of polarization of the input beam 108, in accordance with one or more embodiments of the present disclosure. FIG. 5A is a conceptual view of the states of polarization in the six polarizations regions 402 associated with an input beam 108 with a first state of polarization 502 generated by retroreflection in the corner-cube retroreflector 212, in accordance with one or more embodiments of the present disclosure. FIG. 5B is a plot of a distribution of the states of polarization illustrated in FIG. 5A, in accordance with one or more embodiments of the present disclosure. FIG. 5C is a conceptual view of the states of polarization in the six polarizations regions 402 associated with an input beam 108 with a second state of polarization 504 generated by retroreflection in the corner-cube retroreflector 212, in accordance with one or more embodiments of the present disclosure. FIG. 5D is a plot of a distribution of the states of polarization illustrated in FIG. 5C, in accordance with one or more embodiments of the present disclosure.

Referring now to Equations (9)-(14), the interference of the polarization-split beam 214 with the retroreflected second beam 208 (e.g., the intensity of the intensity-split beam 218) based on the layout in FIG. 2 and the relationship to the state of polarization of the input beam 108 is described in greater detail, in accordance with one or more embodiments of the present disclosure.

The optical field of the retroreflected second beam 208 (e.g., by the mirror 216) may be written as:

$$E_M = \begin{pmatrix} 1 & 0 \\ 0 & -1 \end{pmatrix}\begin{pmatrix} E_s \\ E_p \end{pmatrix}, \quad (9)$$

where the 2-by-2 matrix denotes the Jones matrix of the mirror.

The optical field of the intensity-split beam 218 may be associated with a coherent superposition of the polarization-split beam 214 with the retroreflected second beam 208:

$$E = E_M + E_{CC}, \quad (10)$$

The associated intensity of the intensity-split beam 218 may be written as:

$$I = \left[1 + A^2C + A\ \text{Re}\{J_{11} + J_{22})e^{i\phi_0}\}\right]S_0 + \quad (11)$$
$$\left[A\ \text{Re}\{J_{11} - J_{22})e^{i\phi_0}\}\right]S_1 +$$
$$\left[A\ \text{Re}\{J_{21} + J_{12})e^{i\phi_0}\}\right]S_2 +$$
$$\left[A\ \text{Im}\{J_{21} - J_{12})e^{i\phi_0}\}\right]S_3$$

where $\phi_0$ is the phase difference between the two optical fields ($E_M$ and $E_{CC}$), A=T/8 includes any constant complex reflection coefficients associated with the corner-cube retroreflector 212 and the non-polarizing beamsplitter 202, and $J_{im}$ denotes components of the 2-by-2 Jones matrices, and $S_0$-$S_3$ represent the four Stokes parameters of the input beam 108.

Figure 6:
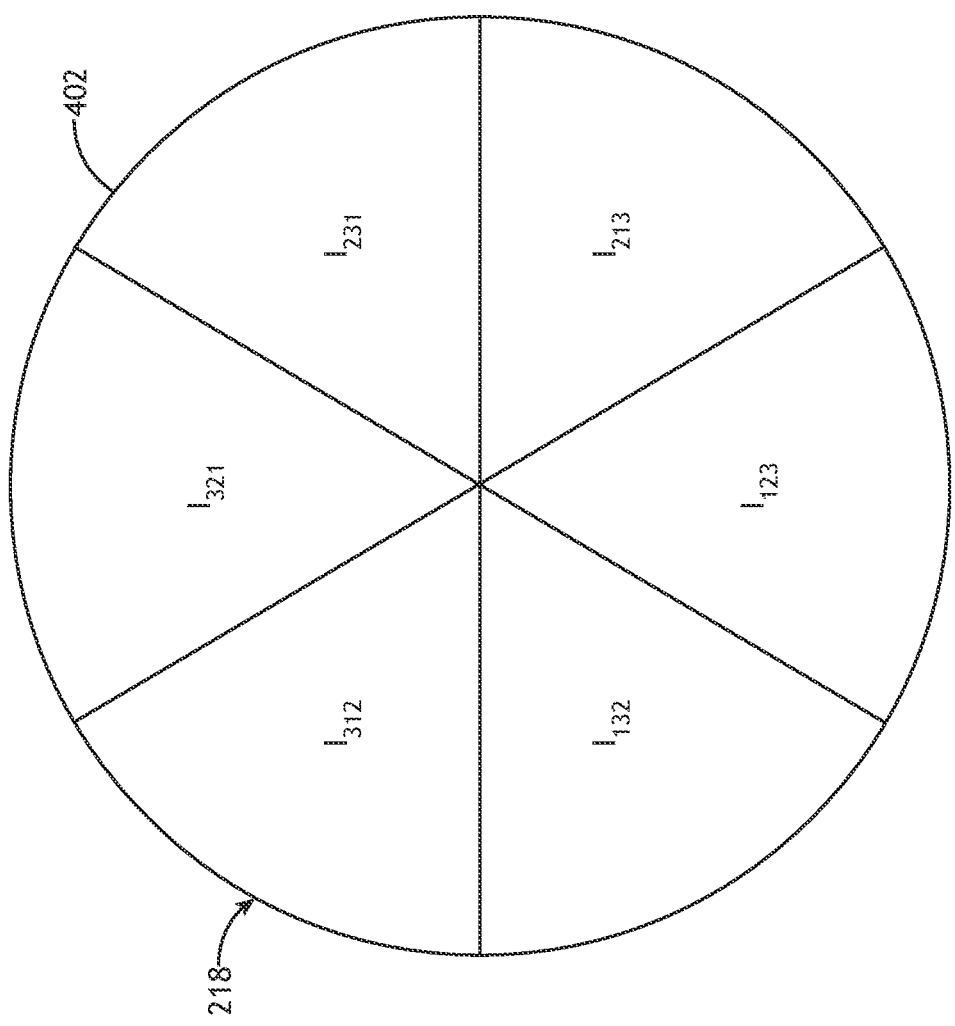
FIG. 6 is a conceptual view of an intensity profile of the intensity-split beam, in accordance with one or more embodiments of the present disclosure.

FIG. 6 is a conceptual view of an intensity profile of the intensity-split beam 218, in accordance with one or more embodiments of the present disclosure. It is contemplated herein that the variations of the polarization in the six polarization regions 402 (e.g., illustrated in FIG. 4) may result in an intensity profile of the intensity-split beam 218 with six intensity regions 602 with the same orientation. For example, in the case that the state of polarization of the input beam 108 is spatially uniform, each of the six intensity regions 602 may have a different intensity value.

For example, based on Equations (1)-(11), the intensities within the six intensity regions 602 may be written as:

$$\begin{pmatrix} I_{123} \\ I_{321} \\ I_{231} \\ I_{132} \\ I_{312} \\ I_{213} \end{pmatrix} = \begin{pmatrix} a-2b & c & d & 0 \\ a-2b & c & -d & 0 \\ a+b & c & d & e \\ a+b & c & -d & e \\ a+b & c & d & -e \\ a+b & c & -d & -e \end{pmatrix}\begin{pmatrix} S_o \\ S_1 \\ S_2 \\ S_3 \end{pmatrix}, \quad (12)$$

where coefficients a, b, c, d, and e are functions of the Jones matrices described above.

In this case of the corner-cube retroreflector 212, Equation (12) is an overdetermined system such that the four Stokes parameters of the input beam 108, and thus a complete description of the state of polarization of the input beam 108, may be fully characterized based on the intensities in only four of the six intensity regions 602. For example, one can write:

$$\begin{pmatrix} \frac{(I_{231}+I_{312})}{2} - I_{123} \\ \frac{I_{132}}{2} + \frac{(I_{231}+I_{312})}{3} - \frac{I_{231}}{6} \\ I_{231} - I_{132} \\ I_{231} - I_{312} \\ I_{312} \\ I_{213} \end{pmatrix} = \begin{pmatrix} 3b & 0 & 0 & 0 \\ a & c & 0 & 0 \\ 0 & 0 & 2d & 0 \\ 0 & 0 & 0 & 2e \\ a+b & c & d & -e \\ a+b & c & -d & -e \end{pmatrix}\begin{pmatrix} S_0 \\ S_1 \\ S_2 \\ S_3 \end{pmatrix}, \quad (13)$$

or more simply as:

$$\begin{pmatrix} \frac{(I_{231}+I_{312})}{2} - I_{123} \\ \frac{I_{132}}{2} + \frac{(I_{231}+I_{312})}{3} - \frac{I_{231}}{6} \\ I_{231} - I_{132} \\ I_{231} - I_{312} \end{pmatrix} = \begin{pmatrix} 3b & 0 & 0 & 0 \\ a & c & 0 & 0 \\ 0 & 0 & 2d & 0 \\ 0 & 0 & 0 & 2e \end{pmatrix}\begin{pmatrix} S_0 \\ S_1 \\ S_2 \\ S_3 \end{pmatrix} = M\begin{pmatrix} S_0 \\ S_1 \\ S_2 \\ S_3 \end{pmatrix}, \quad (14)$$

where the intensities $I_{321}$ and $I_{213}$ are not needed.

Finally, the four Stokes parameters of the input beam 108 may be determined based on a rearrangement of Equation (14).

$$\begin{pmatrix} S_0 \\ S_1 \\ S_2 \\ S_3 \end{pmatrix} = \begin{pmatrix} \frac{1}{3b} & 0 & 0 & 0 \\ -\frac{a}{3bc} & \frac{1}{c} & 0 & 0 \\ 0 & 0 & \frac{1}{2d} & 0 \\ 0 & 0 & 0 & \frac{1}{2e} \end{pmatrix} \begin{pmatrix} \frac{(I_{231}+I_{312})}{2} - I_{123} \\ \frac{I_{132}}{2} + \frac{(I_{312}+I_{123})}{3} - \frac{I_{231}}{6} \\ I_{231} - I_{132} \\ I_{231} - I_{312} \end{pmatrix} = \quad (15)$$

$$M^{-1} \begin{pmatrix} \frac{(I_{231}+I_{312})}{2} - I_{123} \\ \frac{I_{132}}{2} + \frac{(I_{312}+I_{123})}{3} - \frac{I_{231}}{6} \\ I_{231} - I_{132} \\ I_{231} - I_{312} \end{pmatrix}.$$

In Equations (14) and (15), the matrix M may represent an "instrument matrix" or an instrument "Mueller matrix" that describes the modification to the Stokes vector to be measured as introduced by inherent properties of real elements of the measuring system (e.g., the interferometer 102). For example, the instrument matrix may account for various impacts of the physical components such as, but not limited to, dispersion of glass elements, non-ideal reflectivity of the surfaces of the corner-cube retroreflector 212, absorption, or numerical aperture effects.

The instrument matrix may be determined using any technique known in the art. In some embodiments, the instrument matrix is determined through a series of measurements with controlled states of polarization of the input beam 108 such as, but not limited to, horizontal/vertical linear polarization, +/−45° linear polarization, and right/left circular polarization.

It is contemplated herein that the instrument matrix may be static, at least for a certain set of measurement conditions and/or expected parameters of the input beam 108 such as, but not limited to, the wavelength, divergence, or spot size. In this way, the state of polarization of an arbitrary input beam 108 may be determined based on Equation (15) given a known instrument matrix. Further, the instrument matrix need not be known prior to the measurement of the arbitrary input beam 108. For example, measurement data associated with an arbitrary input beam 108 may be stored in memory (e.g., memory device 114) and processed at a later time based on Equation (15) once the instrument matrix is determined or otherwise selected.

Referring again generally to FIG. 1, the detector 106 may include any number or type of sensing elements. In some embodiments, the detector 106 includes a two-dimensional sensor (e.g., a pixel array) such as, but not limited to, a charge-coupled device (CCD) sensor or a complementary metal-oxide-semiconductor (CMOS) sensor. In this way, the detector 106 may generate an image of a beam profile of the intensity-split beam 218 (e.g., as illustrated in FIG. 6), or a portion thereof, where each of the intensity regions 602 of the intensity-split beam 218 may be spatially resolved.

In some embodiments, the detector 106 includes two or more single-pixel sensors or groups thereof such as, but not limited to, photodiodes, avalanche photodiodes, or photomultipliers. For example, the detector 106 may include one or more single-pixel sensors in selected intensity regions 602 of the intensity-split beam 218 to capture the intensity at one or more locations in the selected intensity regions 602.

As described previously herein, it may be the case that the state of polarization of the input beam 108 may be fully determined based on a subset of the generated intensity regions 602 (e.g., four of the six intensity regions 602 when using a corner-cube retroreflector 212). In some embodiments, the detector 106 includes sensor elements arranged to capture intensity values from each of the intensity regions 602 regardless of the number of intensity regions 602 needed for determining the state of polarization of the input beam 108. In some embodiments, the detector 106 includes sensor elements arranged to capture intensity values from only the required intensity regions 602.

It is further contemplated herein that a distribution of intensity values within each of the intensity regions 602 may depend on the spatial uniformity (or non-uniformity) of the polarization of the input beam 108.

When the input beam 108 has a spatially-uniform (e.g., spatially homogenous) polarization distribution, the intensity within each of the intensity regions 602 may also be spatially uniform. In this case, the intensity within a particular intensity region 602 of the intensity regions 602 may be captured by a single sensor element (e.g., a single pixel of a 2D sensor element or a single-pixel sensor). However, in some embodiments, measurements from multiple locations within a particular intensity region 602 are captured such that an intensity measurement in the particular intensity region 602 may be associated with a mathematical combination of the associated data such as, but not limited to, an average of the associated data.

Figure 7:
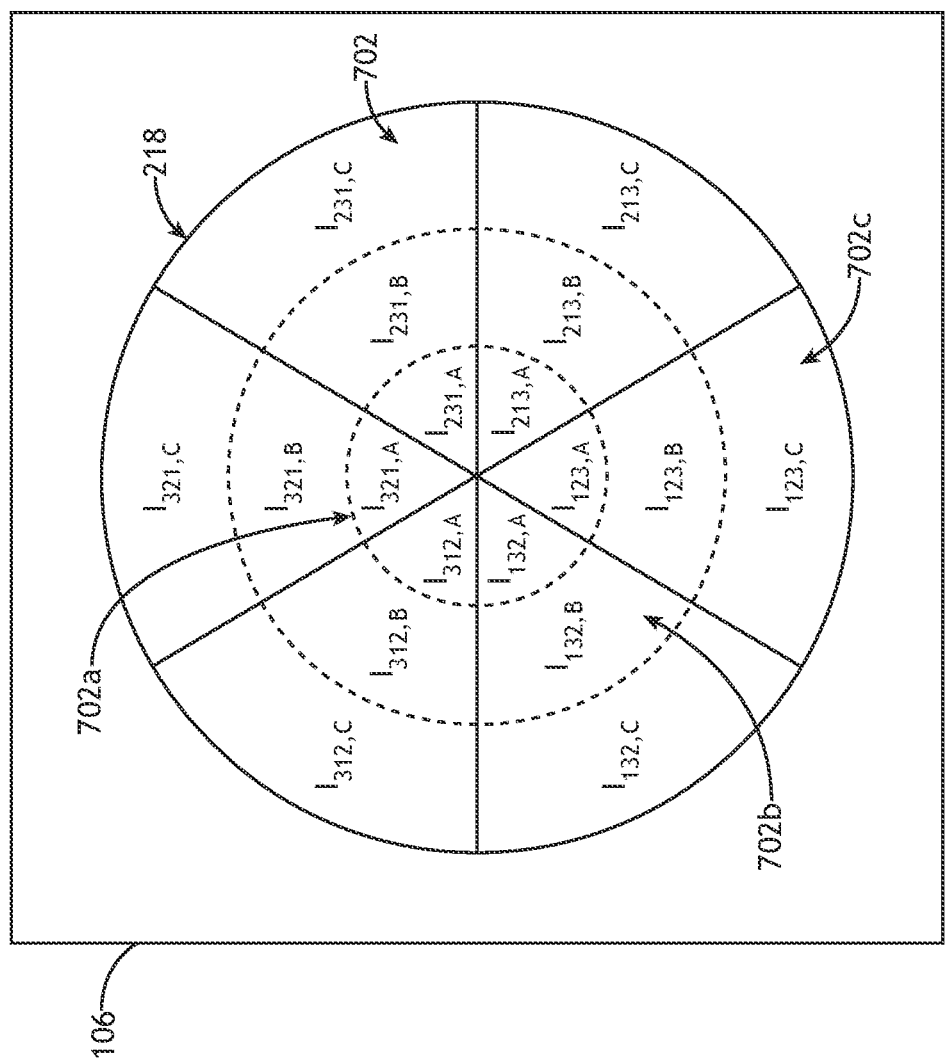
FIG. 7 is a conceptual view of a detector with a 2D sensor configured to capture the intensity of the entire intensity-split beam from FIG. 6, where different detection regions of the detector provide measurements in different radial bands, in accordance with one or more embodiments of the present disclosure.

However, when the polarization distribution of the input beam 108 is spatially non-uniform (e.g., spatially non-homogenous), the intensity within each of the intensity regions 602 may also be non-uniform. In this case, a spatially-resolved measurement of the polarization distribution of the input beam 108 may be provided by capturing intensity data within corresponding sub-sections of the intensity regions 602. For example, measurements of the state of polarization of the input beam 108 at different radial positions may be determined by separately analyzing the intensity within corresponding radial bands of the intensity-split beam 218. As an illustration, FIG. 7 is a conceptual view of a detector 106 with a 2D sensor configured to capture the intensity of the entire intensity-split beam 218 from FIG. 6, where different detection regions 702 of the detector 106 provide measurements in different radial bands, in accordance with one or more embodiments of the present disclosure. In this configuration, the pixels of the detector 106 (not shown for clarity) within each detection region 702 are used to capture intensity values within that region. Accordingly, a first polarization measurement of the input beam 108 within a first detection region 702a may be generated based on $I_{lmn,A}$, a second polarization measurement of the input beam 108 within a second detection region 702b may be generated based on $I_{lmn,B}$, and a third polarization measurement of the input beam 108 within a third detection region 702c may be generated based on $I_{lmn,C}$. It is to be understood, however, that the illustration in FIG. 7 and the associated description is provided solely for illustrative purposes and should not be interpreted as limiting. For example, any number or distribution of detection regions 702 may be utilized to provide spatially-resolved polarization measurements.

Figure 8:
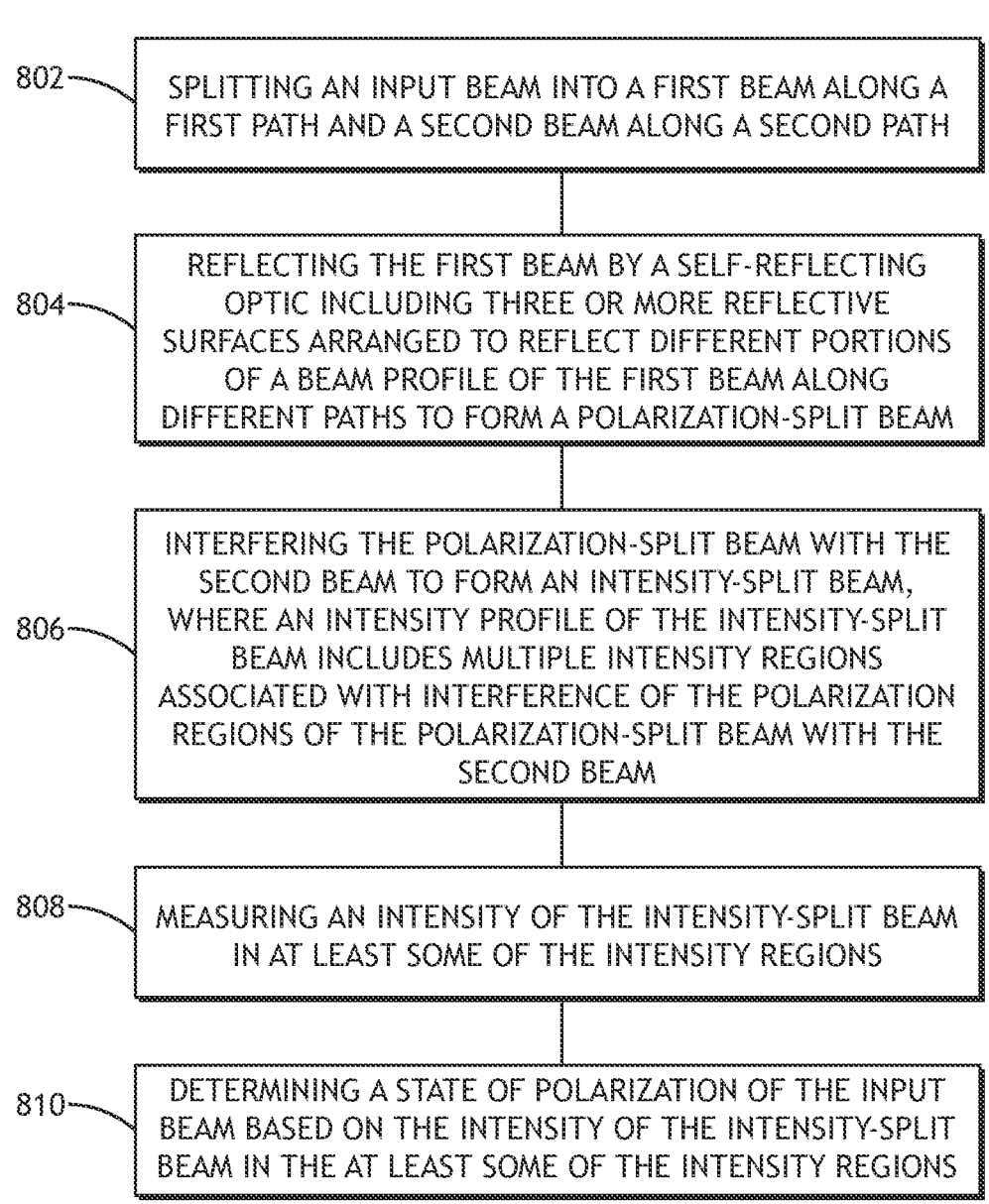
FIG. 8 is a flow diagram illustrating steps performed in a method, in accordance with one or more embodiments of the present disclosure.

Referring now to FIG. 8, FIG. 8 is a flow diagram illustrating steps performed in a method 800, in accordance with one or more embodiments of the present disclosure. Applicant notes that the embodiments and enabling technologies described previously herein in the context of the single-shot polarimeter 100 should be interpreted to extend to the method 800. It is further noted, however, that the method 800 is not limited to the architecture of the single-shot polarimeter 100.

In some embodiments, the method 800 includes a step 802 of splitting an input beam 108 into a first beam 204 along a first path and a second beam 208 along a second path. For example, the step 802 may be, but is not required to be, performed by beamsplitter (e.g., a non-polarizing beamsplitter, or the like).

In some embodiments, the method 800 includes a step 804 of reflecting the first beam 204 by a self-reflecting optic 104 including three or more reflective surfaces arranged to reflect different portions of a beam profile of the first beam 204 along different paths to form a polarization-split beam 214, where a beam profile of the polarization-split beam 214 includes multiple regions associated with different paths between the three or more reflective surfaces. The self-reflecting optic 104 may include any optical element including three or more reflective surfaces suitable for inducing different polarization transformations for different regions across the beam profile of the first beam 204 such as, but not limited to, a corner-cube retroreflector.

In some embodiments, the method 800 includes a step 806 of interfering the polarization-split beam 214 with the second beam 208 to form an intensity-split beam 218, where an intensity profile of the intensity-split beam 218 includes multiple intensity regions 602 associated with interference of the polarization regions of the polarization-split beam 214 with the second beam 208.

In some embodiments, the method 800 includes a step 808 of measuring an intensity of the intensity-split beam in at least some of the intensity regions 602. In some embodiments, the method 800 includes a step 810 of determining a state of polarization of the input beam based on the intensity of the intensity-split beam in the at least some of the intensity regions 602.

When the input beam 108 has a spatially-uniform (e.g., spatially homogenous) polarization distribution, the intensity within each of the intensity regions 602 may also be spatially uniform. In this case, the intensity within a particular intensity region 602 of the intensity regions 602 may be captured by one or more sensor elements within measured intensity regions 602. However, when the polarization distribution of the input beam 108 is spatially non-uniform (e.g., spatially non-homogenous), the intensity within each of the intensity regions 602 may also be non-uniform. In this case, a spatially-resolved measurement of the polarization distribution of the input beam 108 may be provided by capturing intensity data within corresponding sub-sections of the intensity regions 602. As an illustration, a radially-resolved state of polarization of the input beam 108 may be determined by measuring radially-resolved intensity values in at least some of the intensity regions 602.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A polarimeter comprising:
   a non-polarizing beamsplitter configured to split an input beam into a first beam along a first path and a second beam along a second path;
   a corner-cube retroreflector including three orthogonal reflective faces intersecting at an apex point, wherein the corner-cube retroreflector receives the first beam at a location including the apex point and retroreflects the first beam as a polarization-split beam, wherein a beam profile of the polarization-split beam includes six polarization regions with different states of polarization, wherein each of the six polarization regions is associated with a different order of reflections from the three orthogonal reflective faces of the corner-cube retroreflector;
   a mirror in the second path to retroreflect the second beam as a retroreflected second beam, wherein the non-polarizing beamsplitter combines the polarization-split beam and the retroreflected second beam as an intensity-split beam, wherein an intensity profile of the intensity-split beam includes six intensity regions associated with interference of the six polarization regions of the polarization-split beam with the retroreflected second beam;
   one or more detectors to measure an intensity of the intensity-split beam in at least some of the six intensity regions; and
   a controller communicatively coupled with the one or more detectors, wherein the controller is configured to determine a state of polarization of the input beam based on the intensity of the intensity-split beam in the at least some of the six intensity regions.

2. The polarimeter of claim 1, wherein the one or more detectors comprise:
   four or more single-pixel detectors located in at least four of the six intensity regions.

3. The polarimeter of claim 1, wherein the one or more detectors comprise:
   a two-dimensional pixel array.

4. The polarimeter of claim 1, wherein the controller is configured to determine a spatially-resolved state of polarization of the input beam based on intensities of the at least some of the six intensity regions captured within spatially-resolved regions of the one or more detectors.

5. The polarimeter of claim 1, wherein the intensity of the intensity-split beam in the at least some of the six intensity regions measured by the one or more detectors comprises radially-resolved intensity values, wherein the controller is configured to determine a radially-resolved state of polarization of the input beam based on the radially-resolved intensity values.

6. The polarimeter of claim 1, further comprising:
a case surrounding the non-polarizing beamsplitter, the corner-cube retroreflector, the mirror, and the one or more detectors, wherein the input beam enters the case through an aperture.

7. The polarimeter of claim 1, wherein the controller is further configured to display the state of polarization of the input beam on a display.

8. A polarimeter comprising:
an interferometer configured to split an input beam into a first beam along a first path and a second beam along a second path, wherein the interferometer includes a self-reflecting optical element located in the first path, wherein the self-reflecting optical element includes three or more reflective surfaces configured to reflect different portions of a beam profile of the first beam along different paths between the three or more reflective surfaces to form a polarization-split beam, wherein a beam profile of the polarization-split beam includes a plurality of polarization regions associated with a plurality of different paths between the three or more reflective surfaces, wherein the interferometer further combines light from the first and second paths to form an intensity-split beam, wherein an intensity profile of the intensity-split beam includes a plurality of intensity regions associated with interference of the plurality of polarization regions of the polarization-split beam with the second beam;
one or more detectors to measure an intensity of the intensity-split beam in at least some of the plurality of intensity regions; and
a controller communicatively coupled with the one or more detectors, wherein the controller is configured to determine a state of polarization of the input beam based on the intensity of the intensity-split beam in the at least some of the plurality of intensity regions.

9. The polarimeter of claim 8, wherein the self-reflecting optical element comprises:
a corner-cube retroreflector.

10. The polarimeter of claim 8, wherein the interferometer comprises:
a Michelson interferometer.

11. The polarimeter of claim 8, wherein the one or more detectors comprise:
four or more single-pixel detectors located in at least four of the plurality of intensity regions.

12. The polarimeter of claim 8, wherein the one or more detectors comprise:
a two-dimensional pixel array.

13. The polarimeter of claim 8, wherein the controller is configured to determine a spatially-resolved state of polarization of the input beam based on intensities of the at least some of the plurality of intensity regions captured within spatially-resolved regions of the one or more detectors.

14. The polarimeter of claim 8, wherein the intensity of the intensity-split beam in the at least some of the plurality of intensity regions measured by the one or more detectors comprises radially-resolved intensity values, wherein the controller is configured to determine a radially-resolved state of polarization of the input beam based on the radially-resolved intensity values.

15. The polarimeter of claim 8, further comprising:
a case surrounding the interferometer and the one or more detectors, wherein the input beam enters the case through an aperture.

16. A method comprising:
splitting an input beam into a first beam along a first path and a second beam along a second path;
reflecting the first beam by a self-reflecting optical element located in the first path, wherein the self-reflecting optical element includes three or more reflective surfaces configured to reflect different portions of a beam profile of the first beam along different paths between the three or more reflective surfaces to form a polarization-split beam, wherein a beam profile of the polarization-split beam includes a plurality of polarization regions associated with a plurality of different paths between the three or more reflective surfaces;
interfering the polarization-split beam with the second beam to form an intensity-split beam, wherein an intensity profile of the intensity-split beam includes a plurality of intensity regions associated with interference of the plurality of polarization regions of the polarization-split beam with the second beam;
measuring an intensity of the intensity-split beam in at least some of the plurality of intensity regions with one or more detectors; and
determining a state of polarization of the input beam based on the intensity of the intensity-split beam in the at least some of the plurality of intensity regions.

17. The method of claim 16, wherein measuring the intensity of the intensity-split beam in at least some of the plurality of intensity regions comprises:
measuring the intensity of the intensity-split beam with four or more single-pixel detectors located in at least four of the plurality of intensity regions.

18. The method of claim 16, wherein measuring the intensity of the intensity-split beam in at least some of the plurality of intensity regions comprises:
measuring the intensity of the intensity-split beam with a two-dimensional pixel array.

19. The method of claim 16, wherein determining the state of polarization of the input beam based on the intensity of the intensity-split beam in the at least some of the plurality of intensity regions comprises:
determining a spatially-resolved state of polarization of the input beam based on intensities of the at least some of the plurality of intensity regions captured within spatially-resolved regions of the one or more detectors.

20. The method of claim 16, wherein measuring the intensity of the intensity-split beam in at least some of the plurality of intensity regions comprises:
measuring radially-resolved intensity values in at least some of the plurality of intensity regions, wherein determining the state of polarization of the input beam based on the intensity of the intensity-split beam in the at least some of the plurality of intensity regions comprises:
determining a radially-resolved state of polarization of the input beam based on the radially-resolved intensity values.

\* \* \* \* \*